US012026584B2

(12) United States Patent
Ritter et al.

(10) Patent No.: US 12,026,584 B2
(45) Date of Patent: Jul. 2, 2024

(54) OPTICALLY MULTIPLEXED QUANTUM CONTROL INTERFACE

(71) Applicant: INTERNATIONAL BUSINESS MACHINES CORPORATION, Armonk, NY (US)

(72) Inventors: Mark B. Ritter, Sherman, CT (US); Jason S. Orcutt, Katonah, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 898 days.

(21) Appl. No.: 16/950,634

(22) Filed: Nov. 17, 2020

(65) Prior Publication Data

US 2022/0156619 A1  May 19, 2022

(51) Int. Cl.
*G06N 10/00* (2022.01)
(52) U.S. Cl.
CPC .................................. *G06N 10/00* (2019.01)
(58) Field of Classification Search
CPC .............................. G06N 10/00; G06N 10/40
(Continued)

(56) References Cited

U.S. PATENT DOCUMENTS

| 9,892,365 B2 | 2/2018 | Rigetti et al. |
| 10,379,420 B1 | 8/2019 | Wang |

(Continued)

FOREIGN PATENT DOCUMENTS

| CN | 109039589 A | 12/2018 |
| CN | 110198189 A | 9/2019 |

(Continued)

OTHER PUBLICATIONS

F. Lecocq, F. Quinlan, K. Cicak, J. Aumentado, S. A. Diddams, and J. D. Teufel, "Control and readout of a superconducting qubit using a photonic link," National Institute of Standards and Technology, 325 Broadway, Boulder, CO 80305, USA and Department of Physics, University of Colorado, Boulder. (Year: 2020).*

(Continued)

*Primary Examiner* — Khaled M Kassim
*Assistant Examiner* — Oladiran Gideon Olaleye
(74) *Attorney, Agent, or Firm* — Amin, Turocy & Watson, LLP

(57) ABSTRACT

A qubit control system for a quantum computer includes an optical waveguide configured to receive and transmit therethrough a wavelength division multiplexed optical signal which has a plurality of modulated optical carriers, each optical carrier being at a different optical wavelength and carrying a digital qubit control signal; an optical demultiplexer optically coupled to the optical waveguide to receive the multiplexed optical signal to recover the plurality of modulated optical carriers; a plurality of photodetectors in communication with the optical demultiplexer; a plurality of cryogenic filters in communication with the plurality of photodetectors, each being configured to filter corresponding one of the plurality of digital qubit control signals to provide a corresponding one of a plurality of analog qubit control signals which is directed to a corresponding superconducting qubit and the photodetectors. The cryogenic filters are provided at a cryogenic temperature.

20 Claims, 4 Drawing Sheets

(58) Field of Classification Search
USPC .......................................................... 370/277
See application file for complete search history.

(56) References Cited

U.S. PATENT DOCUMENTS

| | | | |
|---|---|---|---|
| 10,725,361 B1* | 7/2020 | Mukhanov | G02F 7/00 |
| 2019/0042264 A1* | 2/2019 | Zou | G06F 9/30196 |
| 2019/0044668 A1* | 2/2019 | Elsherbini | G06N 10/00 |
| 2020/0075834 A1* | 3/2020 | Topaloglu | G05B 15/02 |
| 2020/0243601 A1* | 7/2020 | Orcutt | G06N 10/00 |
| 2020/0358187 A1* | 11/2020 | Tran | H04B 7/024 |

FOREIGN PATENT DOCUMENTS

| | | | | |
|---|---|---|---|---|
| WO | WO-2015178992 A2 * | 11/2015 | | G06F 13/36 |
| WO | 2020/154745 A1 | 7/2020 | | |
| WO | WO-2020154745 A1 * | 7/2020 | | G06F 1/20 |
| WO | WO-2020155461 A1 * | 8/2020 | | G06F 9/54 |

OTHER PUBLICATIONS

Lecocq et al., "Control and readout of a superconducting qubit using a photonic link", arXiv:2009.01167v1 [quant-ph] Sep. 2, 2020.

Davila-Rodriguez et al., "High-Speed Photodetection and Microwave Generation in a Sub-100 mK Environment", Conference on Lasers and Electro-Optics, Jul. 1, 2019, pp. 1-2 XP055891771.

Quinlan Franklyn et al., "High-Fidelity Cryogenic Photonic Link for the Readout of Superconducting Qubits", 2020 Conference on Lasers and Electro-Optics (CLEO), OSA, May 10, 2020, pp. 1-2, XP033824508.

Charbon E et al: "Cryo-CMOS for quantum computing" 2016 IEEE International Electron Devices Meeting (IEDM), IEEE Dec. 3, 2016, XP033054974.

PCT/EP2021/081180 International Search Report mailed Mar. 4, 2022.

PCT/EP2021/081180 International Written Opinion mailed Mar. 4, 2022.

Lukens, J. M. etal., "Frequency-encoded photonic qubits for scalable quantum information processing", Optica, vol. 4, No. 1, pp. 8-16, Jan. 2017.

Lecocq et al., "Control and readout of a superconducting qubit using a photonic link", arXiv:2009.01167v1 [quant-bh], Sep. 2, 2020, 13 pages.

Davila-Rodriguez et al., "High-Speed Photodetection and Microwave Generation in a Sub-100 mK Environment", Conference on Lasers and Electro-Optics, Jul. 1, 2019, pp. 1-2.

Quinlan et al., "High-Fidelity Cryogenic Photonic Link for the Readout of Superconducting Qubits", 2020 Conference on Lasers and Electro-Optics (CLEO), OSA, May 10, 2020, pp. 1-2.

Charbon et al., "Cryo-CMOS for quantum computing" 2016 IEEE International Electron Devices Meeting (IEDM), IEEE, Dec. 3, 2016, pp. 343-346.

International Search Report and Written Opinion received for PCT Application Serial No. PCT/EP2021/081180 dated Mar. 4, 2022, 12 pages.

Examination Report received for Australian Patent Application Serial No. 2021383972 dated Jul. 21, 2023, 3 pages.

Response to the Communication Pursuant to Rule 161(1) and 162 EPC filed for European Patent Application Serial No. 21810332.3 dated Dec. 20, 2023, 41 pages.

* cited by examiner

OPTICALLY MULTIPLEXED QUANTUM CONTROL INTERFACE

BACKGROUND

The currently claimed embodiments of the present invention relate to quantum computation, and more specifically, to a method of controlling qubits in a quantum computer and a qubit control system for a quantum computer.

One building block in quantum computing is to be able to prepare qubits in specific quantum states. Qubits in a superconducting quantum computer are usually controlled using radio frequency energy. The radio frequency energy is delivered via a radio frequency line to a resonator which in turn interacts with the qubit to control the quantum states of the qubit.

The number of control radio frequency lines can scale with the number of qubits in a quantum computer. At very large numbers of qubits, the number of radio frequency lines can become also very large. In order to reduce the number of lines used, it may be desirable to employ multiplexers and demultiplexers to be able to send a plurality of radio frequency energy signals to the plurality of qubits. However, even when using multiplexers and demultiplexers to transmit radio frequency energy signals, a problem remains that these types of systems are bulky, and more importantly only allow a limited number of qubit signals to be multiplexed (on the order of 8) because qubit frequencies are re-used across a quantum device by non-near-neighbor qubits. Therefore, there is a need to solve this and other problems of existing signal transport techniques.

SUMMARY

An aspect of the present invention is to provide a method of controlling qubits in a quantum computer. The method includes receiving a wavelength division multiplexed optical signal through an optical link, wherein the wavelength division multiplexed optical signal has a plurality of modulated optical carriers, each optical carrier of said plurality of modulated optical carriers having a different optical wavelength and each carrying a digital qubit control signal; demultiplexing the wavelength division multiplexed optical signal to recover the plurality of modulated optical carriers, each of which carrying the digital qubit control signal; detecting the digital qubit control signal of each of the plurality of modulated optical carriers using a respective photodetector; filtering the digital qubit control signal in each of the plurality of modulated optical carriers using a corresponding cryogenic filter to provide an analog qubit control signal; and directing the analog qubit control signal to a corresponding superconducting qubit in a plurality of superconducting qubits. The detecting and the filtering are performed at a cryogenic temperature.

In an embodiment, the filtering the digital qubit control signal in each of the plurality of modulated optical carriers using the corresponding cryogenic filter to provide the analog qubit control signal includes filtering the digital qubit control signal in each of the plurality of modulated optical carriers using a superconducting LC bandpass cryogenic filter to provide the analog qubit control signal.

In an embodiment, the method further includes after filtering the digital qubit control signal in each of the plurality of modulated optical carriers using the corresponding cryogenic filter to provide the analog qubit control signal and before directing the analog qubit control signal to the corresponding superconducting qubit, attenuating the analog qubit control signal using an attenuator to reduce extraneous microwave energy present in the analog qubit control signal.

In an embodiment, the detecting and the filtering are performed at a first cryogenic temperature that is higher than a second cryogenic operating temperature of the corresponding superconducting qubit.

In an embodiment, the method further includes multiplexing electrically each analog qubit control signal using an electrical multiplexer to output a single electrical control analog signal to reduce a number of transmission lines needed to transport each analog qubit control signal to the corresponding superconducting qubit.

In an embodiment, receiving the wavelength division multiplexed optical signal through the optical link includes transmitting the wavelength division multiplexed optical signal through an optical waveguide. In an embodiment, at least one of the detecting and the filtering is performed at essentially an operating temperature of the plurality of superconducting qubits. In an embodiment, each of the plurality of superconducting qubits has a control signal in a radiofrequency (RF) spectral range.

Another aspect of the present invention is to provide a qubit control system for a quantum computer. The qubit control system includes an optical waveguide configured to receive and transmit therethrough a wavelength division multiplexed optical signal, wherein the wavelength division multiplexed optical signal has a plurality of modulated optical carriers, each optical carrier of the plurality of optical carriers being at a different optical wavelength and carrying a digital qubit control signal; and an optical demultiplexer optically coupled to the optical waveguide to receive the wavelength division multiplexed optical signal after being transmitted through the optical waveguide to recover the plurality of modulated optical carriers, each of which carrying a corresponding one of a plurality of digital qubit control signals. The qubit control system further includes a plurality of photodetectors in communication with the optical demultiplexer, each of the plurality of photodetectors being configured to detect the corresponding one of the plurality of digital qubit control signals; and a plurality of cryogenic filters in communication with the plurality of photodetectors, each of the plurality of cryogenic filters being configured to filter the corresponding one of the plurality of digital qubit control signals to provide a corresponding one of a plurality of analog qubit control signals. The corresponding one of the plurality of analog qubit control signals is directed to a corresponding superconducting qubit in a plurality of superconducting qubits. The plurality of photodetectors and the plurality of cryogenic filters are provided at a cryogenic temperature.

In an embodiment, each of the plurality of cryogenic filters includes a superconducting LC bandpass cryogenic filter.

In an embodiment, the qubit control system further includes a plurality of attenuators that are coupled to the plurality of cryogenic filters, each of the plurality of attenuators being configured to reduce extraneous microwave energy present in the corresponding one of the plurality of analog qubit control signals.

In an embodiment, the plurality of photodetectors and the plurality of cryogenic filters are provided at a first temperature that is higher than a second cryogenic operating temperature of the plurality of superconducting qubits.

In an embodiment, each of the corresponding one of the plurality of analog qubit control signals is in a radiofrequency (RF) wavelength range corresponding to an excitation energy of the corresponding superconducting qubit to be controlled.

In an embodiment, the qubit control system according further includes an electrical multiplexer coupled to the plurality of cryogenic filters, the electrical multiplexer being configured to multiplex electrically each analog qubit control signal to output a single electrical control analog signal to reduce a number of transmission lines needed to transport each analog qubit control signal to the corresponding superconducting qubit.

In an embodiment, each photodetector in the plurality of photodetectors is a Germanium (Ge) on silicon (Si) photodetector configured to operate in a photovoltaic mode of operation to minimize power dissipation.

Yet another aspect of the present invention is to provide a quantum computer including a refrigeration system including a temperature-controlled vessel; a quantum processor disposed within the temperature-controlled vessel, the quantum processor comprising a plurality of qubits; and a qubit control system extending into the temperature-controlled vessel to provide control of the plurality of qubits. The qubit control system includes an optical waveguide configured to receive and transmit therethrough a wavelength division multiplexed optical signal, wherein the wavelength division multiplexed optical signal has a plurality of modulated optical carriers, each optical carrier of the plurality of optical carriers being at a different optical wavelength and carrying a digital qubit control signal; and an optical demultiplexer optically coupled to said optical waveguide to receive the wavelength division multiplexed optical signal after being transmitted through the optical waveguide to recover the plurality of modulated optical carriers, each of which carrying a corresponding digital qubit control signal. The qubit control system further includes a plurality of photodetectors in communication with the optical demultiplexer, each of the plurality of photodetectors being configured to detect the corresponding digital qubit control signal; and a plurality of cryogenic filters in communication with the plurality of photodetectors, each of the plurality of cryogenic filters being configured to filter the corresponding digital qubit control signal to provide a corresponding analog qubit control signal. The corresponding analog qubit control signal is directed to a corresponding superconducting qubit in a plurality of superconducting qubits. The plurality of photodetectors and the plurality of cryogenic filters are provided at a cryogenic temperature within the temperature-controlled vessel.

In an embodiment, each of the plurality of cryogenic filters includes a superconducting LC bandpass cryogenic filter.

In an embodiment, the qubit control system further includes a plurality of attenuators that are coupled to the plurality of cryogenic filters, each of the plurality of attenuators being configured to attenuate extraneous microwave energy present in the corresponding analog qubit control signal.

In an embodiment, the plurality of photodetectors and the plurality of cryogenic filters are provided at a first temperature that is higher than a second cryogenic operating temperature of the plurality of superconducting qubits.

In an embodiment, the qubit control system includes an electrical multiplexer coupled to the plurality of cryogenic filters, the electrical multiplexer being configured to multiplex electrically each analog qubit control signal to output a single electrical control analog signal to reduce a number of transmission lines needed to transport each analog qubit control signal to the corresponding superconducting qubit.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

In the following paragraphs, the terms "light" and "optical" are intended to be general to include both visible and non-visible portions of the electromagnetic spectrum such as, but not limited to, visible light, infrared light, near infrared light and ultraviolet light.

Figure 1:
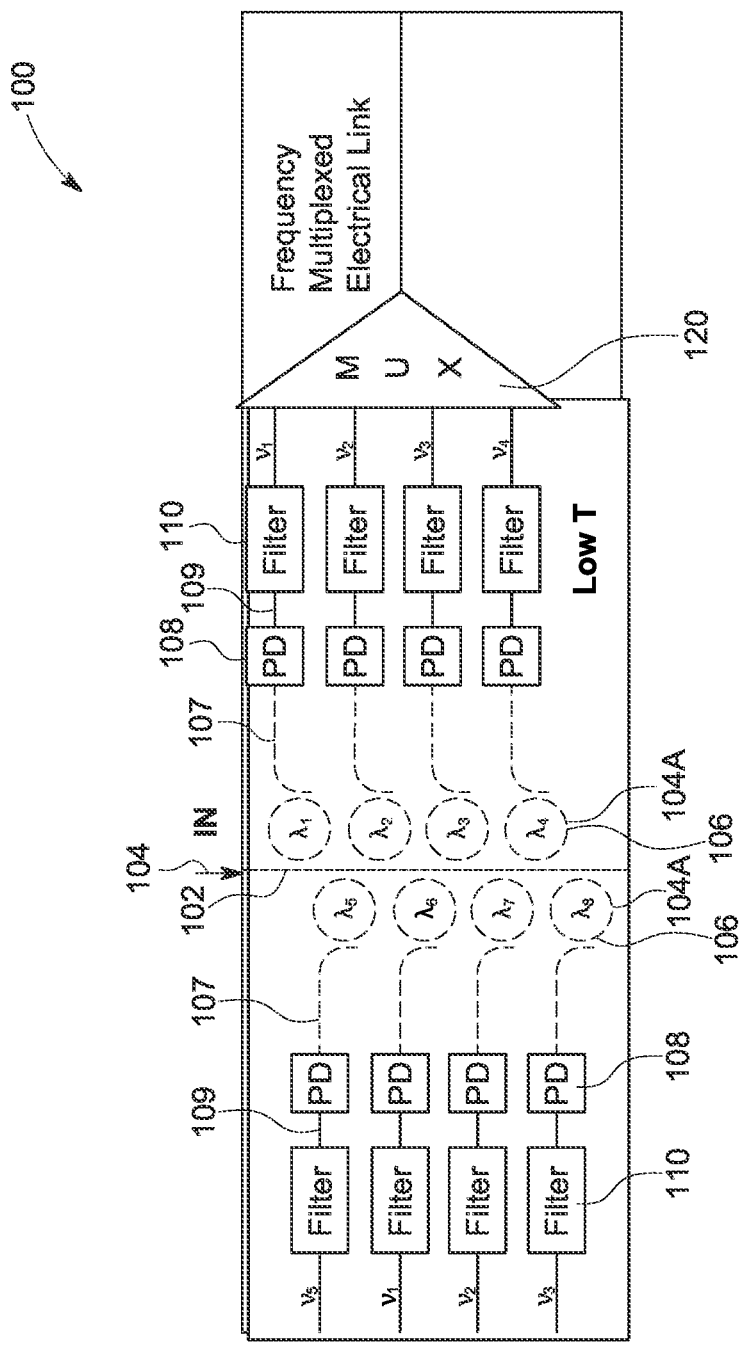
FIG. 1 is schematic diagram of a qubit control system for a quantum computer, according to an embodiment of the present invention.

FIG. 1 is schematic diagram of a qubit control system 100 for a quantum computer (not shown), according to an embodiment of the present invention. The qubit control system 100 includes an optical waveguide 102 configured to receive and transmit therethrough a wavelength division multiplexed optical signal 104. The wavelength division multiplexed signal 104 has a plurality of modulated optical carriers 104A. Each optical carrier of the plurality of modulated optical carriers 104A is at a different optical wavelength ($\lambda_1, \lambda_2, \ldots$) and carrying a digital qubit control signal. The example in FIG. 1 has eight optical carriers demultiplexed by rings resonators 104A into eight different wavelengths ($\lambda_1, \lambda_2, \ldots, \lambda_8$). However, the broad concepts of this invention are not limited to any particular number of optical carriers or optical demultiplexing scheme. There can be more than eight, or less than eight without limitation.

In an embodiment, an optical source (not shown in FIG. 1) can include, for example, a plurality of lasers. The plurality of lasers can be, but are not limited to, Fabry Perot gain medium lasers that can be used to generate appropriately spaced optical wavelengths ($\lambda_1, \lambda_2, \ldots$) in the optical waveguide 102. For example, a quantum dot-based diode laser operating as an optical frequency comb generator can be used. The quantum dot-based laser can be coupled to the optical waveguide (e.g., an optical fiber) to provide for example several low noise 80 GHz spaced optical modes at about, for example, 1310 nm. However, any number of lasers (one, two or more) can also be used, each laser can be configured to deliver one or more optical wavelengths. Regardless of how the plurality of optical wavelengths are generated, they are each modulated at room temperature with a particular qubit control signal.

The qubit control system 100 also includes an optical demultiplexer (DEMUX) 106 optically coupled to the optical waveguide 102 to receive the wavelength division multiplexed optical signal 104 after being transmitted through the optical waveguide 102 to recover the plurality of modulated optical carriers 104A, each of which carrying a corresponding one of a plurality of digital qubit control signals. The optical DEMUX 106 can include, for example, ring resonator structures coupled to optical waveguide 102 through evanescent radiation in some embodiments. However, the general concepts of the current invention are not limited to only this embodiment.

The qubit control system 100 further includes a plurality of photodetectors (PD) 108 in communication with the optical demultiplexer (DEMUX) 106. Each of the plurality of photodetectors (PD) 108 is configured to detect a corresponding one of the plurality of digital qubit control signals. The qubit control system 100 also includes a plurality of cryogenic filters 110 in communication with the plurality of photodetectors (PD) 108. Each of the plurality of cryogenic filters 110 is configured to filter the corresponding one of the plurality of digital qubit control signals to provide a corresponding one of a plurality of analog qubit control signals (at frequency, v1, v2, . . . ). The corresponding one of the plurality of analog qubit control signals is directed to a corresponding superconducting qubit in a plurality of superconducting qubits (not shown in FIG. 1). The plurality of photodetectors (PD) 108 and the plurality of cryogenic filters 110 are provided at a cryogenic temperature.

In an embodiment, the plurality of photodetectors (PD) 108 are in communication with the optical demultiplexer (DEMUX) 106 via a plurality of optical fibers 107 each optical fiber carrying a corresponding modulated optical carrier 104A at a specific optical wavelength ($\lambda_1$, $\lambda_2$, . . . ). In an embodiment, each photodetector (PD) 108 can be a germanium (Ge) on silicon (Si) photodetector configured to operate in a photovoltaic mode of operation to minimize power dissipation. In an embodiment, the photodetector (PD) 108 can also be a photodiode, a photomultiplier, or a bolometric scale.

In an embodiment, the plurality of cryogenic filters 110 are coupled to the plurality of photodetectors (PD) 108 via a plurality of electrical waveguides 109 (e.g., microwave or radiofrequency waveguides). The plurality of electromagnetic waveguides 109 are configured to transport the digital qubit control signals to the plurality of cryogenic filters 110.

Figure 2A:
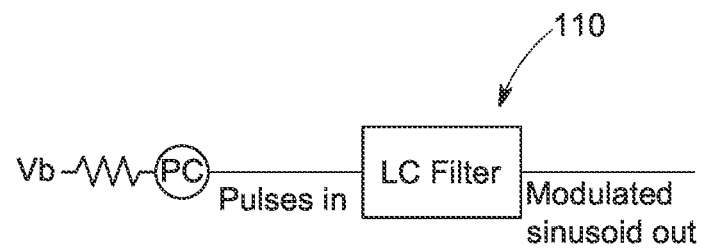
FIGS. 2A and 2B are schematic diagrams showing types of connections of a cryogenic filter, according to embodiments of the present invention.
Figure 2B:
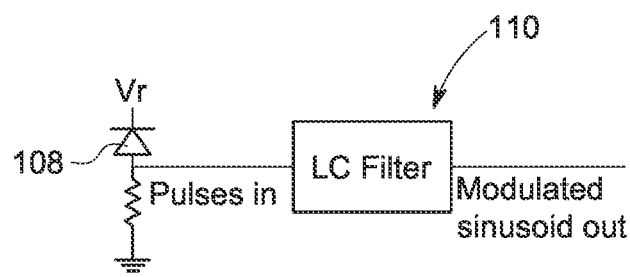

FIGS. 2A and 2B are schematic diagrams showing types of connections of cryogenic filter 110, according to embodiments of the present invention. In an embodiment, each of the plurality of cryogenic filters 110 includes a superconducting LC bandpass cryogenic filter. In an embodiment, the LC bandpass cryogenic filter is connected to photodetector 108 and receives a digital qubit control signal (e.g., including a plurality of voltage radiofrequency pulses) and outputs an analog qubit control signal (e.g., a modulated sinusoid).

Figure 3:
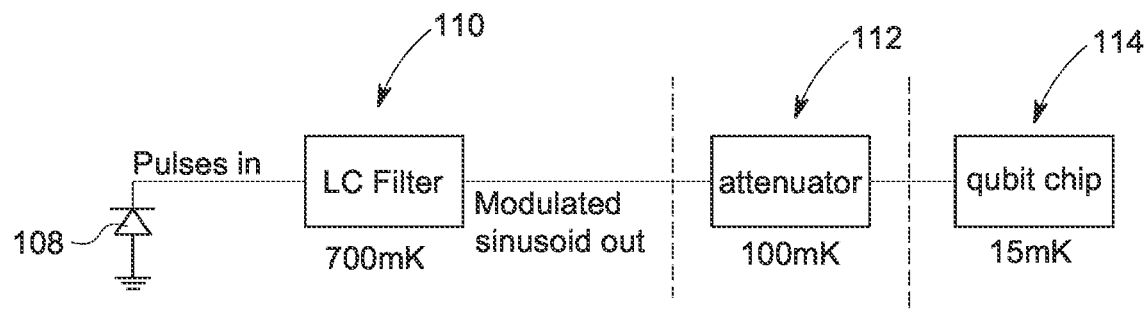
FIG. 3 is a schematic diagram showing a connection of the cryogenic filter to an attenuator prior to connecting to a qubit chip having a plurality of qubits, according to an embodiment of the present invention.

FIG. 3 is a schematic diagram showing a connection of the cryogenic filter 110 to an attenuator 112 prior to connecting to a qubit chip 114 having a plurality of qubits, according to an embodiment of the present invention. In an embodiment, the qubit control system 100 includes a plurality of attenuators 112 that are coupled to the plurality of cryogenic filters (e.g., LC cryogenic filters) 110 and to the qubit chip 114. Each of the plurality of attenuators 112 is configured to reduce extraneous microwave (e.g., radiofrequency) energy present in the corresponding analog qubit control signal output by the cryogenic filter 110 prior to inputting the analog qubit control signal into the qubit chip 114.

In an embodiment, the plurality of photodetectors 108 and the plurality of cryogenic filters 110 are provided at a first temperature that is higher than a second cryogenic operating temperature of the plurality of superconducting qubits. For example, as illustrated in FIG. 3, the plurality of cryogenic filters 110 are provided at a first temperature that is about 700 mK and the plurality of superconducting qubits (qubit chip) 114 is provided at a lower second temperature of about 15 mK. In an embodiment, the attenuators 112 can be provided at an intermediate cryogenic temperature between the temperature of the cryogenic filter 110 and the temperature of the qubit chip 114. For example, as shown in FIG. 3, the attenuator 112 can be provided at a temperature of about 100 mK. In another embodiment, the attenuators 112 can be provided at the first temperature of the cryogenic filters 110 (e.g., 700 mK) or at the second temperature of the plurality of superconducting qubits (e.g., 15 mK) or at any temperature between the first and second temperatures. In addition, if the photodetectors 108 and the cryogenic filters 110 are at the first temperature (e.g., 700 mK) stage that is different than the second temperature (e.g., 15 mK) stage of the plurality of superconducting qubits, attenuators 112 can be provided at either or both the cryogenic filter temperature stage and the plurality of superconducting qubits temperature stage.

In an embodiment, the corresponding analog qubit control signal is in a radiofrequency (RF) wavelength range corresponding to an excitation energy of a corresponding qubit to be controlled in the plurality of qubits in the qubit chip 114.

As shown in FIG. 1, the qubit control system 100, may also include an electrical multiplexer 120 coupled to the plurality of cryogenic filters 110. The electrical multiplexer 120 is configured to multiplex electrically each analog qubit control signal output by the cryogenic filters 110 to output a single electrical control analog signal to reduce a number of transmission lines needed to transport each analog qubit control signal to the corresponding superconducting qubit.

Figure 4:
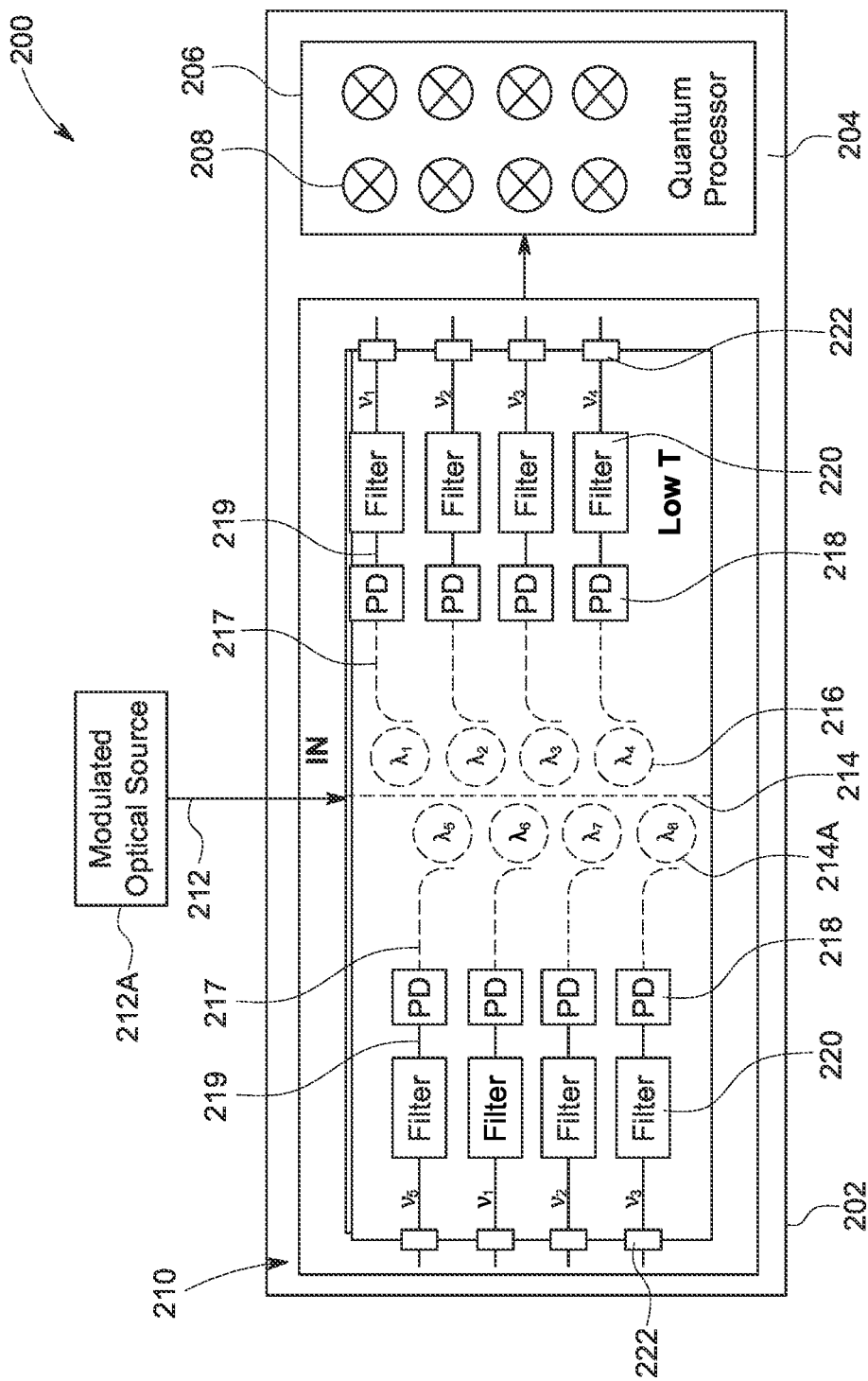
FIG. 4 is a schematic diagram of the quantum computer, according to an embodiment of the present invention.

Another aspect of the present invention is to provide a quantum computer 200. FIG. 4 is a schematic diagram of the quantum computer 200, according to an embodiment of the present invention. The quantum computer 200 includes a refrigeration system 202 including a temperature-controlled vessel 204 and a quantum processor 206 disposed within the temperature-controlled vessel 204. The quantum processor 206 includes a plurality of qubits 208. The quantum computer 200 further includes a qubit control system 210 extending into the temperature-controlled vessel 204 to provide control of the plurality of qubits 208. The qubit control system 210 is similar in many aspects to the qubit control system 100 described in the above paragraphs. Therefore, it must be appreciated many of the features described above with respect to the qubit control system 100 are also available for the qubit control system 210.

The qubit control system 210 includes an optical waveguide 212 configured to receive and transmit therethrough a wavelength division multiplexed optical signal 214. The wavelength division multiplexed signal 214 has a plurality of modulated optical carriers 214A. Each optical carrier of the plurality of optical carriers 214A is at a different optical wavelength ($\lambda_1$, $\lambda_2$, . . . ) and carrying a digital qubit control signal.

In an embodiment, an optical source 212A including for example a plurality of lasers such as Fabry Perot gain medium lasers can be used to generate appropriately spaced optical wavelengths ($\lambda_1, \lambda_2, \ldots$) in the optical waveguide 212.

The qubit control system 100 also includes an optical demultiplexer (DEMUX) 216 optically coupled to the optical waveguide 212 to receive the wavelength division multiplexed optical signal 214 after being transmitted through the optical waveguide 212 to recover the plurality of modulated optical carriers 214A, each of which carrying a corresponding one of a plurality of digital qubit control signals.

The qubit control system 210 further includes a plurality of photodetectors (PD) 218 in communication with the optical demultiplexer 216. Each of the plurality of photodetectors (PD) 218 is configured to detect a corresponding one of the plurality of digital qubit control signals. The qubit control system 210 also includes a plurality of cryogenic filters 220 in communication with the plurality of photodetectors (PD) 218. Each of the plurality of cryogenic filters 220 is configured to filter the corresponding one of the plurality of corresponding digital qubit control signals to provide a corresponding one of a plurality of analog qubit control signals. The corresponding one of the plurality of analog qubit control signals is directed to a corresponding superconducting qubit in a plurality of superconducting qubits 208 in the quantum processor 206. The plurality of photodetectors (PD) 218 and the plurality of cryogenic filters 220 are provided at a cryogenic temperature.

In an embodiment, the plurality of photodetectors (PD) 218 are in communication with the optical demultiplexer 216 via a plurality of optical waveguides 217, each optical waveguide carrying a corresponding modulated optical carrier 104A at a specific optical wavelength ($\lambda_1, \lambda_2, \ldots$). In an embodiment, each photodetector (PD) 218 can be a germanium (Ge) on silicon (Si) photodetector configured to operate in a photovoltaic mode of operation to minimize power dissipation. In an embodiment, each photodetector 108 can also be a photodiode, a photomultiplier, or a bolometric scale.

In an embodiment, the plurality of cryogenic filters 220 are coupled to the plurality of photodetectors (PD) 218 via a plurality of electromagnetic waveguides (e.g., microwave or radiofrequency waveguides) 219. The plurality of electromagnetic waveguides 219 are configured to transport the digital qubit control signals to the plurality of cryogenic filters 220.

The corresponding analog qubit control signal (at frequency v1, v2, . . . ) output by each of the plurality of cryogenic filters 220 is directed to a corresponding superconducting qubit in the plurality of superconducting qubits 208 in the quantum processor 206. The plurality of photodetectors (PD) 218 and the plurality of cryogenic filters 220 are provided at a cryogenic temperature within the temperature-controlled vessel 204.

In an embodiment, the plurality of photodetectors 218 and the plurality of cryogenic filters 220 are provided at a first temperature that is higher than a second cryogenic operating temperature of the plurality of superconducting qubits 208 within the temperature-controlled vessel 204. For example, the temperature-controlled vessel 204 may be provided with a plurality of compartments and the plurality of qubits 208 can be placed in one compartment at one temperature while the plurality of photodetectors 218 and the plurality of cryogenic filters 220 can be placed in another compartment at a different temperature. For example, the plurality of cryogenic filters 220 can be provided at a first temperature that is about 700 mK and the plurality of superconducting qubits 208 can be provided at a lower second temperature of about 15 mK.

In an embodiment, the qubit control system 210 may also include a plurality of attenuators 222 that are coupled to the plurality of cryogenic filters (e.g., LC cryogenic filters) 220 and to the plurality of qubits 208 in quantum processor 206. Each of the plurality of attenuators 222 is configured to reduce extraneous microwave (e.g., radiofrequency) energy present in the corresponding analog qubit control signal output by the cryogenic filter 220 prior to inputting into the quantum processor 206. In an embodiment, the attenuators 222 can be provided at an intermediate cryogenic temperature in another compartment or zone within the temperature-controlled vessel 204 between the temperature of the cryogenic filters 220 and the temperature of the plurality of qubits 208 in the quantum processor 206. For example, the attenuator 222 can be provided at a temperature of about 100 mK. In another embodiment, the attenuators 222 can be provided at the first temperature of the cryogenic filters 220 (e.g., 700 mK) or at the second temperature of the plurality of superconducting qubits (e.g., 15 mK) 208 or at any temperature between the first and second temperatures. In addition, if the photodetectors 218 and the cryogenic filters 220 are at the first temperature (e.g., 700 mK) stage that is different than the second temperature (e.g., 15 mK) stage of the plurality of superconducting qubits 208, attenuators 222 can be provided at either or both the cryogenic filter temperature stage and the plurality of superconducting qubits temperature stage.

In another embodiment, the attenuators 222 can be provided at the first temperature of the cryogenic filters 220 (e.g., 700 mK) or at the second temperature of the plurality of superconducting qubits 208 (e.g., 15 mK) or at any temperature between the first and second temperatures. In addition, if the photodetectors 218 and the cryogenic filters 220 are at the first temperature (e.g., 700 mK) stage that is different than the second temperature (e.g., 15 mK) stage of the plurality of superconducting qubits 208, attenuators 222 can be provided at either or both the cryogenic filter temperature stage and the plurality of superconducting qubits temperature stage.

Figure 5:
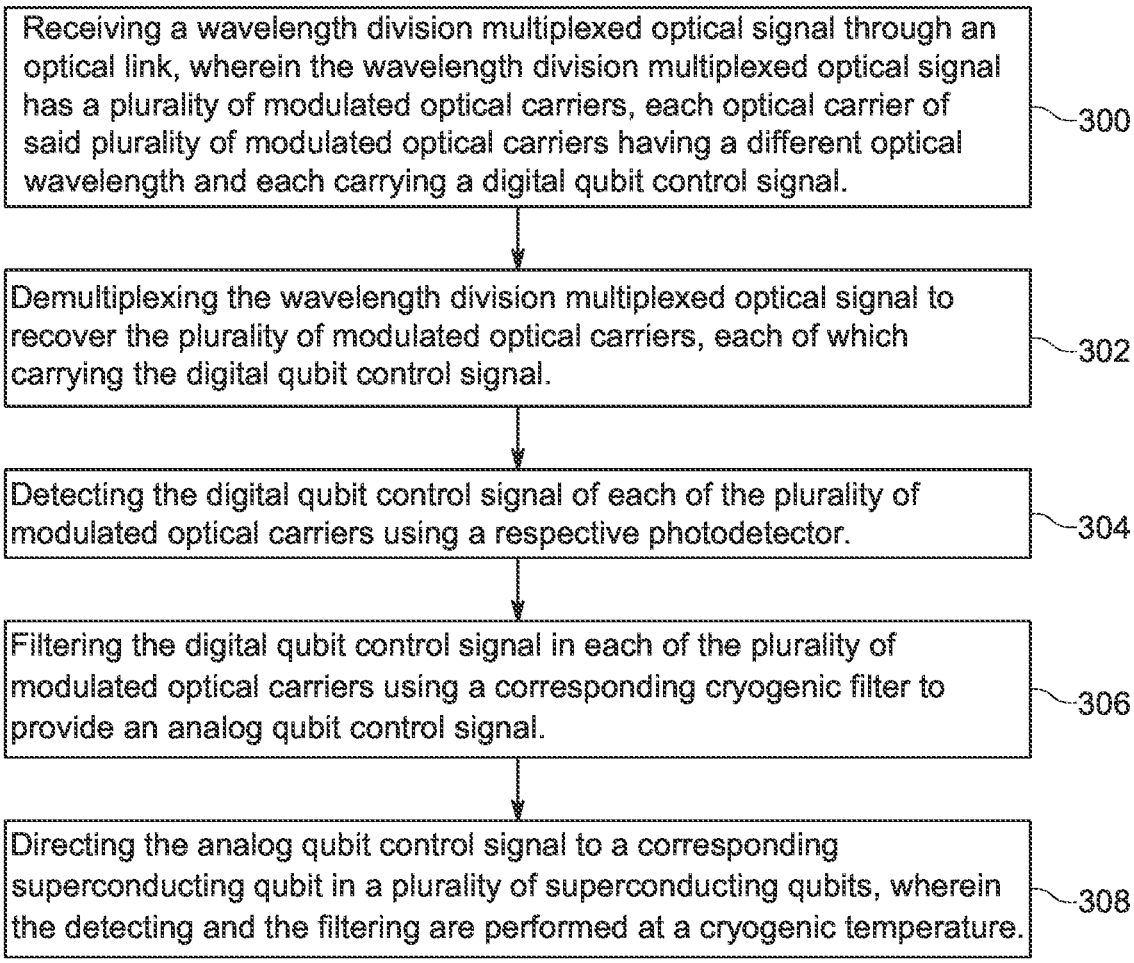
FIG. 5 is a flow chart of a method of controlling qubits in the quantum computer, according to an embodiment of the present invention.

FIG. 5 is a flow chart of a method of controlling qubits in a quantum computer, according to an embodiment of the present invention. The method includes receiving a wavelength division multiplexed optical signal through an optical link, wherein the wavelength division multiplexed optical signal has a plurality of modulated optical carriers, each optical carrier of the plurality of modulated optical carriers having a different optical wavelength and each carrying a digital qubit control signal, at S300. The method further includes demultiplexing the wavelength division multiplexed optical signal to recover the plurality of modulated optical signals, each of which carrying the digital qubit control signal, at S302. The method also includes detecting the digital qubit control signal of each of the plurality of optical carriers using a respective photodetector, at S304 and filtering the digital qubit control signal in each of the plurality of modulated optical carriers using a corresponding cryogenic filter to provide an analog qubit control signal, at S306. The method further includes directing the analog qubit control signal to a corresponding superconducting qubit in a plurality of superconducting qubits, at S308. The detecting and the filtering are performed at a cryogenic temperature.

In an embodiment, the filtering the digital qubit control signal in each of the plurality of modulated optical carriers using the corresponding cryogenic filter to provide the analog qubit control signal includes filtering the digital qubit control signal in each of the plurality of modulated optical carriers using a superconducting LC bandpass cryogenic filter to provide the analog qubit control signal.

The method further includes, after filtering the digital qubit control signal in each of the plurality of modulated optical carriers using the corresponding cryogenic filter to provide the analog qubit control signal and before directing the analog qubit control signal to the corresponding superconducting qubit, attenuating the analog qubit control signal using an attenuator to reduce extraneous microwave energy present in the analog qubit control signal. In an embodiment, the detecting and the filtering are performed at a first cryogenic temperature that is higher than a second cryogenic operating temperature of the corresponding superconducting qubit.

In an embodiment, the method further includes multiplexing electrically each analog qubit control signal using an electrical multiplexer to output a single electrical control analog signal to reduce a number of transmission lines needed to transport each analog qubit control signal to the corresponding superconducting qubit.

In an embodiment, receiving the wavelength division multiplexed optical signal through the optical link includes transmitting the wavelength division multiplexed optical signal through an optical waveguide. In an embodiment, at least one of the detecting and the filtering is performed at essentially an operating temperature of the plurality of superconducting qubits. In an embodiment, each of the plurality of superconducting qubits has a control signal in a radiofrequency (RF) spectral range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of controlling qubits in a quantum computer, comprising:
   receiving, by an optical demultiplexer directly coupled to an optical link, a wavelength division multiplexed optical signal through the optical link, wherein the wavelength division multiplexed optical signal has a plurality of modulated optical carriers, each optical carrier of said plurality of modulated optical carriers having a different optical wavelength and each carrying a distinct digital qubit control signal respectively corresponding to a superconducting qubit of a plurality of superconducting qubits;
   demultiplexing, by respective ring resonators of the optical demultiplexer, the wavelength division multiplexed optical signal to recover the plurality of modulated optical carriers, each of which carrying the distinct digital qubit control signal;
   detecting, by respective photodetectors directly coupled to the ring resonators, the distinct digital qubit control signal of each of the plurality of modulated optical carriers;
   filtering, by respective cryogenic filters directly coupled to the photodetectors, the distinct digital qubit control signal in each of the plurality of modulated optical carriers to provide an analog qubit control signal corresponding to the distinct digital qubit control signal; and
   directing each analog qubit control signal to a corresponding superconducting qubit of the plurality of superconducting qubits,
   wherein the detecting and the filtering are performed at a cryogenic temperature.

2. The method according to claim 1, wherein each of the cryogenic filters comprise a superconducting LC bandpass cryogenic filter.

3. The method according to claim 1, further comprising after filtering the distinct digital qubit control signal in each of the plurality of modulated optical carriers using the corresponding cryogenic filter to provide the analog qubit control signal and before directing the analog qubit control signal to the corresponding superconducting qubit, attenuating, by respective attenuators directly coupled to the cryogenic filters, each analog qubit control signal to reduce extraneous microwave energy present in the analog qubit control signal.

4. The method according to claim 3, wherein;
   the detecting and the filtering are performed at a first cryogenic temperature, and
   the attenuating is performed at a second cryogenic temperature that is lower than the first cryogenic temperature and that is higher than a third cryogenic operating temperature of the corresponding superconducting qubit.

5. The method according to claim 1, further comprising multiplexing electrically each analog qubit control signal using an electrical multiplexer to output a single electrical control analog signal to reduce a number of transmission lines needed to transport each analog qubit control signal to the corresponding superconducting qubit.

6. The method according to claim 1, wherein receiving the wavelength division multiplexed optical signal through the optical link comprises transmitting the wavelength division multiplexed optical signal through an optical waveguide.

7. The method according to claim 1, wherein at least one of the detecting and the filtering is performed at essentially an operating temperature of the plurality of superconducting qubits.

8. The method according to claim 1, wherein each of the plurality of superconducting qubits has a control signal in a radiofrequency (RF) spectral range.

9. A qubit control system for a quantum computer, comprising:
   an optical waveguide configured to receive and transmit therethrough a wavelength division multiplexed optical signal, wherein the wavelength division multiplexed optical signal has a plurality of modulated optical carriers, each optical carrier of the plurality of modulated optical carriers being at a different optical wavelength and carrying a distinct digital qubit control signal respectively corresponding to a superconducting qubit of a plurality of superconducting qubits;
   an optical demultiplexer directly optically coupled to the optical waveguide to receive the wavelength division multiplexed optical signal after being transmitted through the optical waveguide to recover, using respective ring resonators of the optical demultiplexer, the plurality of modulated optical carriers, each of which carrying a corresponding distinct digital qubit control signal;

photodetectors, respectively directly optically coupled to the ring resonators of the optical demultiplexer, each of the plurality-of-photodetectors being configured to detect the corresponding one of the distinct digital qubit control signals;

cryogenic filters, respectively directly coupled to the photodetectors, each of the cryogenic filters being configured to filter the corresponding one of the distinct digital qubit control signals to provide a corresponding one of a plurality of analog qubit control signals, wherein the corresponding one of the plurality of analog qubit control signals is directed to a corresponding superconducting qubit of the plurality of superconducting qubits, and wherein the photodetectors and the cryogenic filters are provided at a cryogenic temperature.

10. The qubit control system according to claim 9, wherein each of the plurality of cryogenic filters comprise a superconducting LC bandpass cryogenic filter.

11. The qubit control system according to claim 9, further comprising attenuators, respectively directly coupled to the cryogenic filters, each of the attenuators being configured to reduce extraneous microwave energy present in the corresponding one of the plurality of analog qubit control signals.

12. The qubit control system according to claim 11, wherein:
the photodetectors and the cryogenic filters are provided at a first cryogenic temperature, and
the attenuators are provided at a second cryogenic temperature that is lower than the first cryogenic temperature and that is higher than a third cryogenic operating temperature of the plurality of superconducting qubits.

13. The qubit control system according to claim 9, wherein each of the corresponding one of the plurality of analog qubit control signals is in a radiofrequency (RF) wavelength range corresponding to an excitation energy of the corresponding superconducting qubit to be controlled.

14. The qubit control system according to claim 9, further comprising an electrical multiplexer coupled to the cryogenic filters, the electrical multiplexer being configured to multiplex electrically each analog qubit control signal to output a single electrical control analog signal to reduce a number of transmission lines needed to transport each analog qubit control signal to the corresponding superconducting qubit.

15. The qubit control system according to claim 9, wherein each photodetector is a Germanium (Ge) on silicon (Si) photodetector configured to operate in a photovoltaic mode of operation to minimize power dissipation.

16. A quantum computer comprising:
a refrigeration system comprising a temperature-controlled vessel;
a quantum processor disposed within the temperature-controlled vessel, the quantum processor comprising a plurality of superconducting qubits; and
a qubit control system extending into the temperature-controlled vessel to provide control of the plurality of superconducting qubits,
wherein the qubit control system comprises:

an optical waveguide configured to receive and transmit therethrough a wavelength division multiplexed optical signal, wherein the wavelength division multiplexed optical signal has a plurality of modulated optical carriers, each optical carrier of the plurality of modulated optical carriers being at a different optical wavelength and carrying a distinct digital qubit control signal respectively corresponding to a superconducting qubit of a plurality of superconducting qubits;

an optical demultiplexer directly optically coupled to said optical waveguide to receive the wavelength division multiplexed optical signal after being transmitted through the optical waveguide to recover, using respective ring resonators of the optical demultiplexer, the plurality of modulated optical carriers, each of which carrying a corresponding distinct digital qubit control signal;

photodetectors, respectively directly optically coupled to the ring resonators of the optical demultiplexer, each of the photodetectors being configured to detect the corresponding distinct digital qubit control signal;

cryogenic filters, respectively directly coupled to the photodetectors, each of the plurality of cryogenic filters being configured to filter the corresponding distinct digital qubit control signal to provide a corresponding analog qubit control signal, wherein the corresponding analog qubit control signal is directed to a corresponding superconducting qubit of the plurality of superconducting qubits, and wherein the photodetectors and the cryogenic filters are provided at a cryogenic temperature within the temperature-controlled vessel.

17. The quantum computer according to claim 16, wherein each of the plurality of cryogenic filters comprise a superconducting LC bandpass cryogenic filter.

18. The quantum computer according to claim 16, further comprising attenuators, respectively directly coupled to the cryogenic filters, each of the attenuators being configured to attenuate extraneous microwave energy present in the corresponding analog qubit control signal.

19. The quantum computer according to claim 18, wherein;
the photodetectors and the cryogenic filters are provided at a first cryogenic temperature, and
the attenuators are provided at a second cryogenic temperature that is lower than the first cryogenic temperature and that is higher than a third cryogenic operating temperature of the plurality of superconducting qubits.

20. The quantum computer according to claim 16, further comprising an electrical multiplexer coupled to the cryogenic filters, the electrical multiplexer being configured to multiplex electrically each analog qubit control signal to output a single electrical control analog signal to reduce a number of transmission lines needed to transport each analog qubit control signal to the corresponding superconducting qubit.

* * * * *